US009728385B2

(12) United States Patent
Latimer

(10) Patent No.: US 9,728,385 B2
(45) Date of Patent: Aug. 8, 2017

(54) DATA RECORD SIZE REDUCTION AT FIXED INFORMATION CONTENT

(71) Applicant: DH TECHNOLOGIES DEVELOPMENT PTE. LTD., Singapore (SG)

(72) Inventor: Darin Latimer, Aurora (CA)

(73) Assignee: DH Technologies Development Pte. Ltd., Singapore (SG)

( * ) Notice: Subject to any disclaimer, the term of this patent is extended or adjusted under 35 U.S.C. 154(b) by 645 days.

(21) Appl. No.: 14/365,980

(22) PCT Filed: Dec. 15, 2012

(86) PCT No.: PCT/IB2012/002722

§ 371 (c)(1),
(2) Date: Jun. 16, 2014

(87) PCT Pub. No.: WO2013/098617

PCT Pub. Date: Jul. 4, 2013

(65) Prior Publication Data

US 2014/0372048 A1 Dec. 18, 2014

Related U.S. Application Data

(60) Provisional application No. 61/581,900, filed on Dec. 30, 2011.

(51) Int. Cl.

*G01N 31/00* (2006.01)
*H01J 49/00* (2006.01)
*H01J 49/40* (2006.01)

(52) U.S. Cl.

CPC ........... *H01J 49/0036* (2013.01); *H01J 49/40* (2013.01)

(58) Field of Classification Search

None
See application file for complete search history.

(56) References Cited

U.S. PATENT DOCUMENTS 5,995,989 A * 11/1999 Gedcke ............... H01J 49/0036 708/203
2007/0143319 A1 6/2007 Malek et al.
(Continued)

FOREIGN PATENT DOCUMENTS

WO 2010136765 A1 12/2010

OTHER PUBLICATIONS

International Search Report and Written Opinion for PCT/IB2012/002722, mailed May 28, 2013.

*Primary Examiner* — Aditya Bhat
(74) *Attorney, Agent, or Firm* — John R. Kasha; Kelly L. Kasha; Kasha Law LLC

(57) ABSTRACT

A time-of-flight (TOF) mass spectrometer analyzes a sample producing a time series of data points representing amounts of detected ions per unit time. A spectrometer resolution, a spectrometer digitization time period, and a minimum number points per peak needed to maintain the information content of a peak are received. A peak width value is calculated for each point from the resolution and a time of each point. The calculated peak width value for each point is divided by the minimum number points per peak. A maximum time difference between points for each point is produced. A point is selected based on the digitization time period. Adjacent points of the selected point are found. If a difference between the adjacent points does not exceed a sum of a maximum time differences of the adjacent points, the selected point is deleted to compress the time series.

15 Claims, 6 Drawing Sheets

(56) References Cited

U.S. PATENT DOCUMENTS

| | | | |
|---|---|---|---|
| 2009/0008545 | A1 | 1/2009 | Fuhrer et al. |
| 2011/0192970 | A1 | 8/2011 | Oonishi et al. |
| 2011/0284736 | A1 | 11/2011 | Willis et al. |

* cited by examiner

200

DATA RECORD SIZE REDUCTION AT FIXED INFORMATION CONTENT

CROSS REFERENCE TO RELATED APPLICATION

This application claims the benefit of U.S. Provisional Patent Application Ser. No. 61/582,900, filed Dec. 30, 2011, the content of which is incorporated by reference herein in its entirety.

INTRODUCTION

In a time-of-flight (TOF) mass spectrometer or mass analyzer, ions of different masses are accelerated with the same amount of energy at a starting time and travel over the same fixed distance to a target detector. At the target detector, the different arrival times of the ions are recorded. The detections of ions over time are easily converted to mass information, since ions with smaller masses arrive sooner than ions with larger masses. As a result, a TOF instrument can provide a mass distribution or mass spectrum.

Often one scan of a sample using a TOF instrument is not sufficient to provide enough accuracy or to distinguish the signal from the noise. Consequently, multiple scans are typically performed with TOF instruments producing multiple mass spectra. These mass spectra are then summed to provide a mass spectrum for the sample, for example.

In general, TOF instruments generate a large amount of data. For example, the detectors of high resolution instruments are sampled at a high rate in order to measure the arrival times of ions with a high precision. Sampling at the high rate also occurs, however, when ions are not being detected. In other words, in-between detections the background or noise is sampled at a high rate also. As a result, a large amount of data is recorded even for a single scan.

Because of the large amount of data recorded by TOF instruments and the ever increasing need to improve their resolution through an increase in sampling rate, the need for data compression in TOF mass spectrometry is rapidly growing. Data compression is needed to reduce the storage requirements of the data initially collected by TOF instruments. However, the continual decrease in price of computer memory has reduced the importance of this need somewhat.

What is becoming more of a challenge is transferring and processing the large data files produced by these instruments. As the resolution of TOF instruments has increased, the possible information to be exacted from this information has also increased. As a result, more numerous and time consuming data analysis tools are being applied to this data. Therefore data compression is needed to decrease both the time needed to transfer this data among these tools and the time needed to perform the analysis on this data.

One method for compressing the data of TOF instruments attempts to exploit the difference between the sampling rates needed for light and heavy mass ions. The ions of lighter mass tend to be bunched closer together than the ions of heavier mass. For example, for lighter mass ions, there is statistically less separation in time between multiple ion strikes from the ion as compared to the statistic separation time for heavier mass ions. In other words, the max-min time for a five mass unit difference is bigger at low mass than at high mass (i.e. 20-25 amu will be less separated in time than 1000-1005 amu). Also, the width of an analog pulse detected for lighter mass ions is usually smaller than the width of an analog pulse detected for heavier mass ions. The need for data reduction is not limited to the data produced by analog to digital (ADC) systems. Data reduction is also needed for the data produced by time to digital (TDC) systems.

As a result, a high sampling rate is needed to adequately sample the analog pulse for lighter mass ions, while a lower sampling rate is adequate to sample the analog pulse for heavier mass ions. This effect can also be described in the time domain. As the time of arrival of ions increases at the detector of a TOF instrument, the sampling rate needed to detect the ions decreases.

An exemplary system for compressing data based on this effect is described in U.S. Pat. No. 7,684,932 issued Mar. 23, 2010 (hereinafter the "'932 patent". In this system a decimator circuit is located between the analog to digital (A/D) converter and the summer of a detection circuit of a TOF instrument. The decimator circuit allows a higher effective sampling rate for analog pulses corresponding with lighter mass ions and lowers the effective sampling rate for analog pulses corresponding with heavier mass ions. In other words, the decimator dynamically decreases the sampling rate as the time of arrival of ions increases.

In the system of the '932 patent, a relationship between mass and peak width is used to dynamically decrease the sampling rate. In one embodiment, the decimator of this system reduces its output rate by a factor each time it decimates the effective sampling rate. Initially, the decimator's output rate is y. Once one-fourth of the mass scan is complete (i.e., at time T/4), the decimator's output rate is reduced by one-half to y/2. Once one-half of the mass scan is complete (i.e., at time T/2), the decimator's output rate is reduced by one-half to y/4. Once three-quarters of the mass scan is completed (i.e., at time 3T/4), the decimator's output rate is again reduced by one-half to y/8. Once the mass scan is complete (i.e., at time T), the decimator's output rate is reset to y for the next mass scan.

The system of the '932 patent provides a specific hardware implementation to perform data compression during data acquisition. The method employed is not useful for compressing data previously acquired by other TOF instruments that do not include the specific hardware implementation. The method also does not specifically take into account the information content required for discerning a peak from data.

BRIEF DESCRIPTION OF THE DRAWINGS

The skilled artisan will understand that the drawings, described below, are for illustration purposes only. The drawings are not intended to limit the scope of the present teachings in any way.

Figure 1:
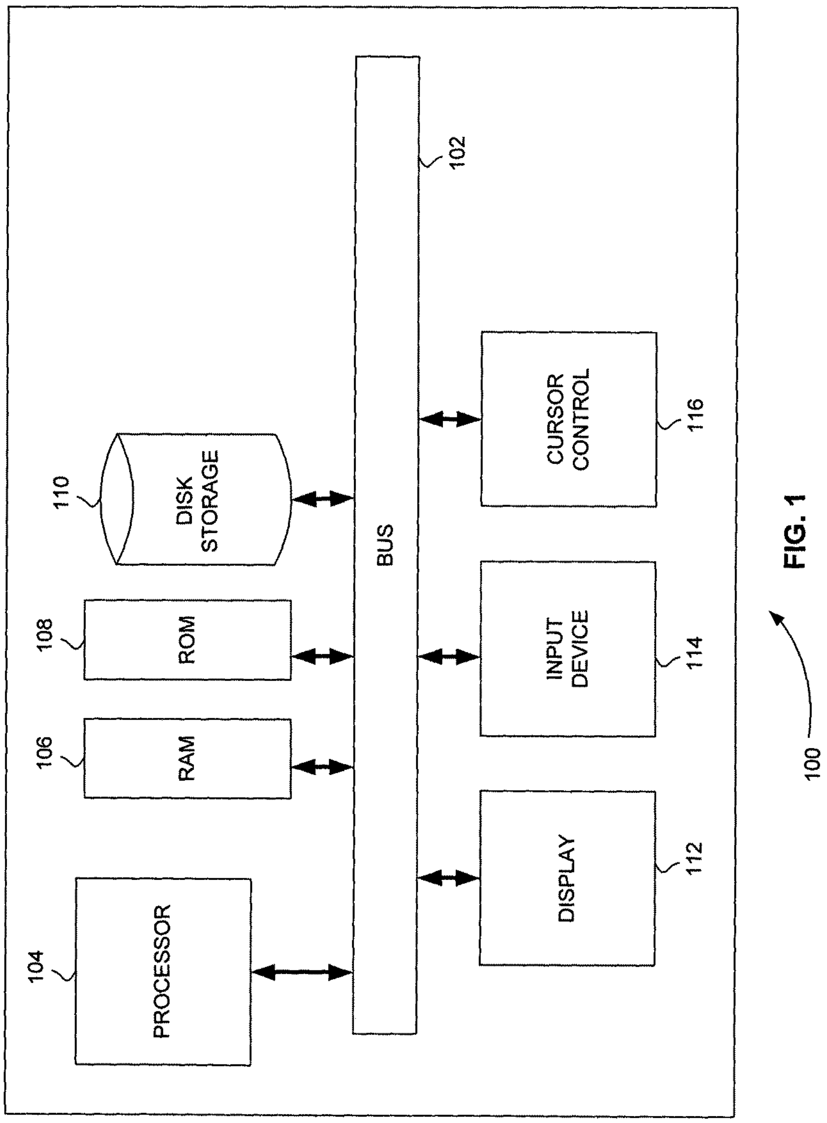
FIG. 1 is a block diagram that illustrates a computer system, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem or over a network. A remote computer can be, but is not limited to, a node of cloud computing system. A cloud computing system can include grid storage, for example. Computer system 100 can receive data from a network and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Data Compression Based on Information Content

As described above, high resolution (time-of flight) TOF instruments can generate a large amount of data. One method for compressing the data generated by TOF instruments attempts to exploit a particular characteristic of TOF instruments. This characteristic is that as the time of arrival of ions increases at the detector of a TOF instrument, the sampling rate needed to detect the ions decreases.

The systems and methods of the '932 patent provide data compression by exploiting this characteristic. The method employed by the '932 patent, however, is not useful for compressing data previously acquired by other TOF instruments that do not include the specific hardware implementation of the '932 patent. The method of the '932 patent also does not does not specifically take into account the information content required for discerning a peak from data.

In various embodiments, a method is provided for compressing data from a TOF instrument based on a relationship between the instrument resolution, the instrument digitization rate or time period, and the information content required for a peak. This method allows the data of any TOF instrument to be compressed at the time of data acquisition or later during post-processing. The method specifically uses the information content required for a peak as an input variable.

It is well known that for TOF instruments with a fixed resolution that the peak width of a peak representing an ion arriving at an earlier time is narrower than the peak width of a peak representing an ion arriving at a later time. Since the peak arriving at a later time is wider, its points provide good candidates for data compression. Before removing points or compressing the data of the later arriving peak, however, the information content of the peak must be preserved. The information content of the peak is preserved by specifying a minimum number of points spaced across the peak from which the peak can be reconstructed. These points may or may not be spaced uniformly, as long as the spacing is known. This number is, for example, five.

If peaks were already identified in the data received from a TOF instrument, data compression would be straightforward. Unfortunately, however, data produced by a TOF instrument consists of a time series of data points. Each point represents a number of detections, or a count of detections, at a particular arrival time. Since the goal is to delete points of peaks with a wide peak width, it is necessary to characterize the peak width expected at each point in the time series. The peak width can be calculated from the resolution of the instrument and the time of each point. The peak width at full width half maximum (FWHM) is, for example, the arrival time divided by twice the resolution of the instrument. A TOF instrument with a FWHM peak width of 400 ps at a 20 μs arrival time has a resolution of 25,000, for example.

Using the peak width, a starting location in the time series where points can start to be deleted is found. This starting location is found by calculating a maximum time difference between points for each point in the time series. Each maximum time difference is found by dividing the calculated peak width value for each point in the time series by the minimum number of uniformly spaced points across the peak from which the peak can be reconstructed. The collection of these maximum time differences or time periods can be thought of as the dynamically changing minimum sampling rate in the frequency domain. Returning to the example described above, if the FWHM peak width for a point at 20 μs is 400 ps and the minimum number of uniformly spaced points across the peak from which the peak can be reconstructed is 5, then the maximum time difference between points for the peak at 20 μs is 80 ps.

The starting location in the time series where points can start to be deleted is any point after the point where a maximum time difference between points is greater than or equal to the digitization time period of the TOF instrument. In the frequency domain, this is where the sampling frequency can be reduced while still maintaining the information content of the peaks. If the digitization time period of the TOF instrument in the above example is 80 ps, then any point after the point at 20 μs can be deleted.

More than one point can be deleted after the starting location in the time series where points can start to be deleted using various sampling algorithms. It is important to maintain the integrity of the data in the deletion process, however. The integrity of the data is enforced, for example, by maintaining a constraint on the time difference between any two remaining points in the time series. For example, if a difference in time between two adjacent points that are remaining after a point in-between is deleted exceeds the sum of the maximum time differences calculated for the two remaining points, then the point in-between is not deleted. In the frequency domain, this constraint is the minimum sampling rate between the two remaining points.

Figure 2:
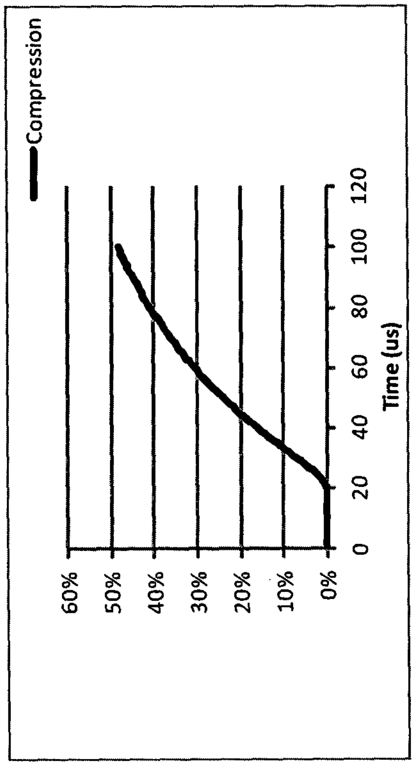
FIG. 2 is an exemplary plot of the percent of data compression for various arrival times of time-of-flight (TOF) mass spectrometry data produced by a method of data compression, in accordance with various embodiments.

FIG. 2 is an exemplary plot 200 of the percent of data compression for various arrival times of time-of-flight (TOF) mass spectrometry data produced by a method of data compression, in accordance with various embodiments. Plot 200 shows that compression begins after an initial starting point where points can start to be deleted using a sampling algorithm.

Figure 3:
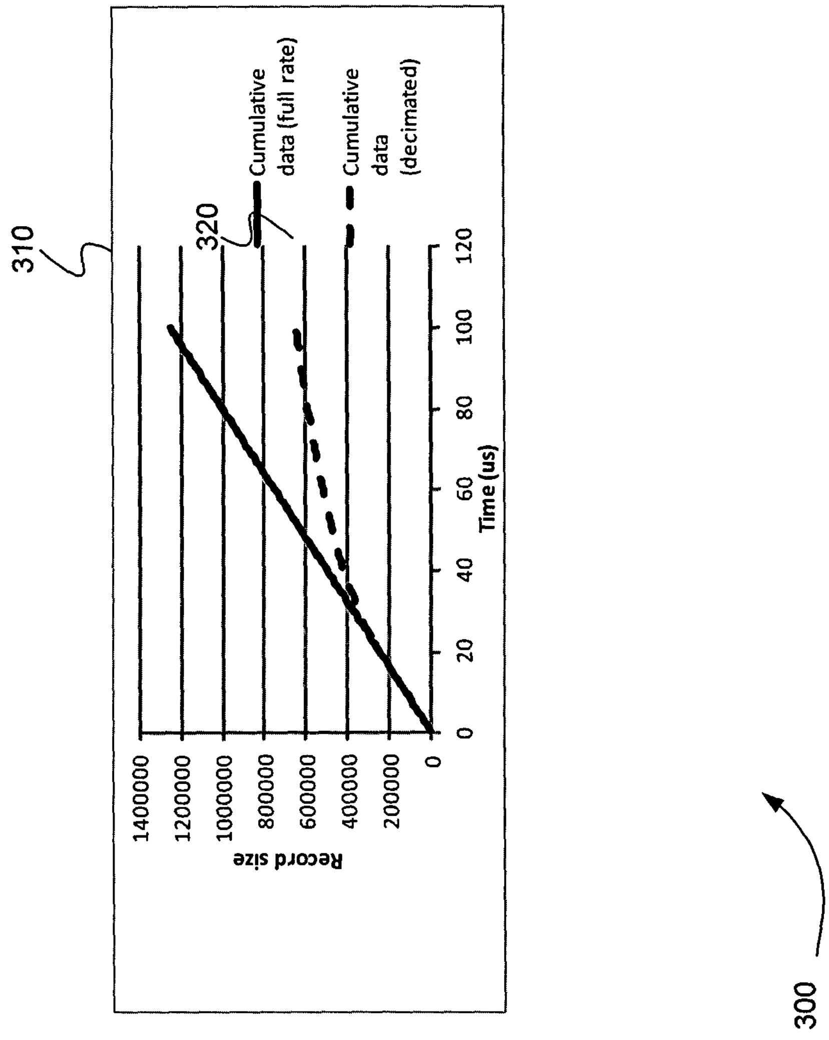
FIG. 3 is an exemplary plot of a comparison of cumulative TOF mass spectrometry data that is not decimated by data compression and cumulative TOF mass spectrometry data that is decimated using a method of data compression, in accordance with various embodiments.

FIG. 3 is an exemplary plot 300 of a comparison of cumulative TOF mass spectrometry data 310 that is not decimated by data compression and cumulative TOF mass spectrometry data 320 that is decimated using a method of data compression, in accordance with various embodiments. The record size of cumulative data 310 increases at a constant rate with increasing arrival times. The record size of cumulative data 320 increases at a decreasing rate with increasing arrival times after data compression begins.

Systems and Methods of Data Processing

Time-of-Flight Mass Spectrometry Data Compression System

Figure 4:
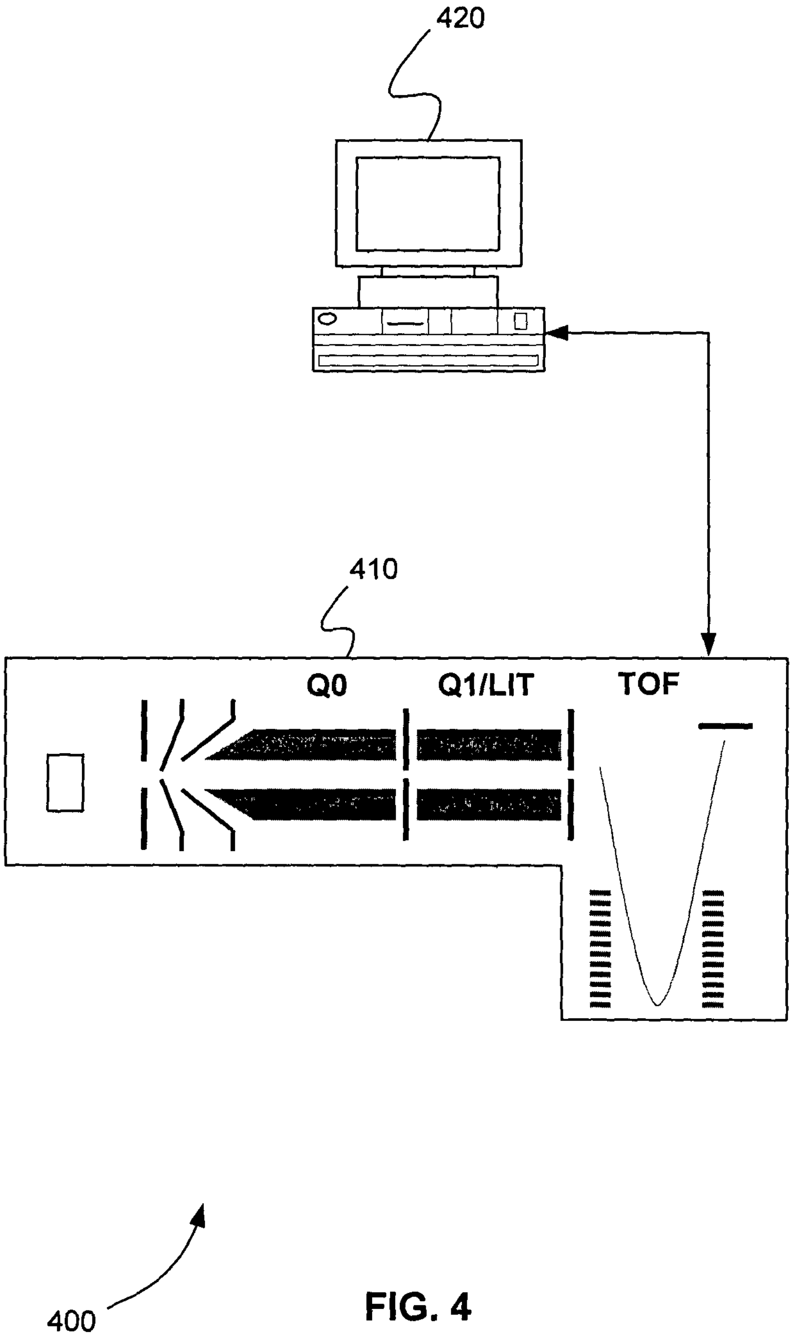
FIG. 4 is a schematic diagram showing a system for compressing TOF mass spectrometry data, in accordance with various embodiments.

FIG. 4 is a schematic diagram showing a system 400 for compressing TOF mass spectrometry data, in accordance with various embodiments. System 400 includes TOF mass spectrometer 410, and processor 420.

TOF mass spectrometer 410 is a mass spectrometer that includes a TOF mass analyzer. TOF mass spectrometer 410 can include one or more physical mass analyzers that perform one or more mass analyses. TOF mass spectrometer 410 analyzes a sample producing a time series of data points representing amounts of detected ions per unit time. For example, each data point can represent a count of the detected ions at a particular time.

Processor 420 is in communication with TOF mass spectrometer 410. Processor 420 can be, but is not limited to, a computer, microprocessor, or any device capable of sending and receiving control signals and data to and from TOF mass spectrometer 410 and processing data.

Processor 420 receives the time series data points from TOF mass spectrometer 410. Processor 420 can receive the time series data points directly from TOF mass spectrometer 410 in real time, or processor 420 can receive the time series data points indirectly from TOF mass spectrometer 410 after data acquisition through a file stored in memory, for example. In various embodiments, processor 420 can receive the time series data points directly from TOF mass spectrometer 410 using an electronic circuit located between an analog to digital converter (A2D) and an accumulator of TOF mass spectrometer 410. In various alternative embodiments, processor 420 can receive the time series data points directly from TOF mass spectrometer 410 using an electronic circuit located after an accumulator of TOF mass spectrometer 410. Processor 420 can receive the time series data points directly from TOF mass spectrometer 410 using an electronic circuit located after an accumulator if the accumulator is preceded by an A2D or a time to digital (TDC) device, for example.

Processor 420 receives a resolution of TOF mass spectrometer 410, a digitization time period of TOF mass spectrometer 410, and a minimum number points per peak needed to maintain the information content of a peak.

Processor 420 calculates a peak width value for each point in the time series from the resolution and a time of each point. Processor 420 divides the calculated peak width value for each point in the time series by the minimum number points per peak. A maximum time difference between points for each point in the time series is produced. Processor 420 selects a point of the time series that has a time greater than a time of a point of the time series that has a maximum time difference between points greater than or equal to the digitization time period.

Processor 420 locates a first point of the time series adjacent to and preceding the selected point and a second point of the time series adjacent to and following the selected point. If a difference in time between a time of the first point and the second point does not exceed the sum of the maximum time differences of the first point and the second point, processor 420 deletes the selected point to compress the time series.

In various embodiments, processor 420 calculates a peak width value for each point in the time series from the resolution and a time of each point by dividing the time of each point by twice the resolution. In various embodiments, the processor peak width value is a full width half maximum (FWHM) value.

In various embodiments, processor 420 receives the time series from TOF mass spectrometer 410 as TOF mass spectrometer 410 is acquiring the time series. Alternatively, processor 420 receives the time series from TOF mass spectrometer 410 after TOF mass spectrometer 410 acquires the time series. For example, the time series can be read from a stored data file.

Time-of-Flight Mass Spectrometry Data Compression Method

Figure 5:
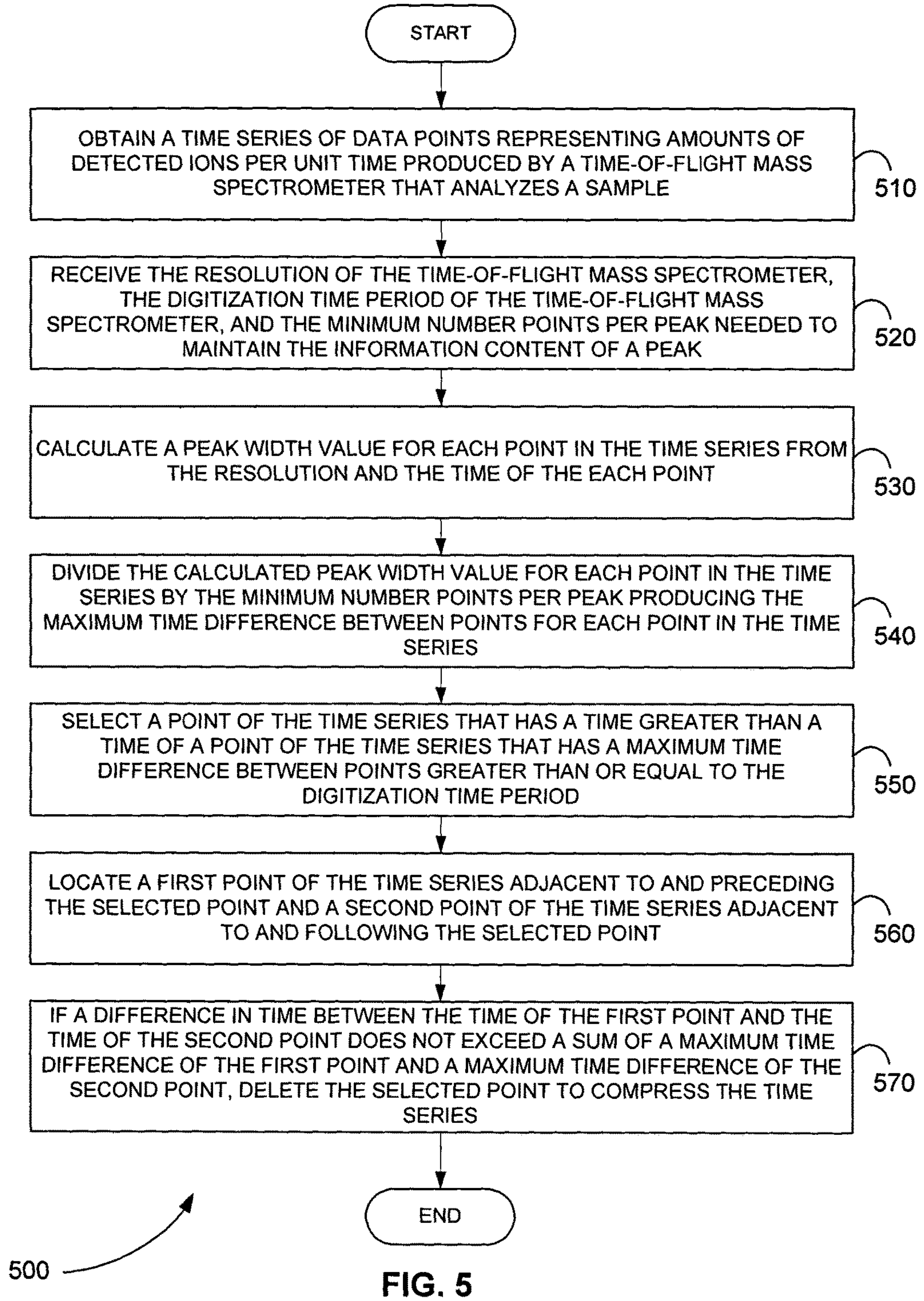
FIG. 5 is an exemplary flowchart showing a method for compressing TOF mass spectrometry data, in accordance with various embodiments.

FIG. 5 is an exemplary flowchart showing a method 500 for compressing time-of-flight mass spectrometry data, in accordance with various embodiments.

In step 510 of method 500, a time series of data points representing amounts of detected ions per unit time produced by a time-of-flight mass spectrometer that analyzes a sample is obtained.

In step 520, the resolution of the time-of-flight mass spectrometer, the digitization time period of the time-of-flight mass spectrometer, and the minimum number points per peak needed to maintain the information content of a peak are received.

In step 530, a peak width value for each point in the time series is calculated from the resolution and the time of the each point.

In step 540, the calculated peak width value for each point in the time series is divided by the minimum number points per peak producing a maximum time difference between points for each point in the time series.

In step 550, a point of the time series is selected that has a time greater than a time of a point of the time series that has a maximum time difference between points greater than or equal to the digitization time period.

In step 560, a first point of the time series adjacent to and preceding the selected point and a second point of the time series adjacent to and following the selected point are located.

In step 570, if a difference in time between the time of the first point and the time of the second point does not exceed a sum of a maximum time difference of the first point and a maximum time difference of the second point, the selected point is deleted to compress the time series.

Time-of-Flight Mass Spectrometry Data Compression Computer Program Product

In various embodiments, a computer program product includes a non-transitory and tangible computer-readable storage medium whose contents include a program with instructions being executed on a processor so as to perform a method for compressing time-of-flight mass spectrometry data. This method is performed by a system that includes one or more distinct software modules.

Figure 6:
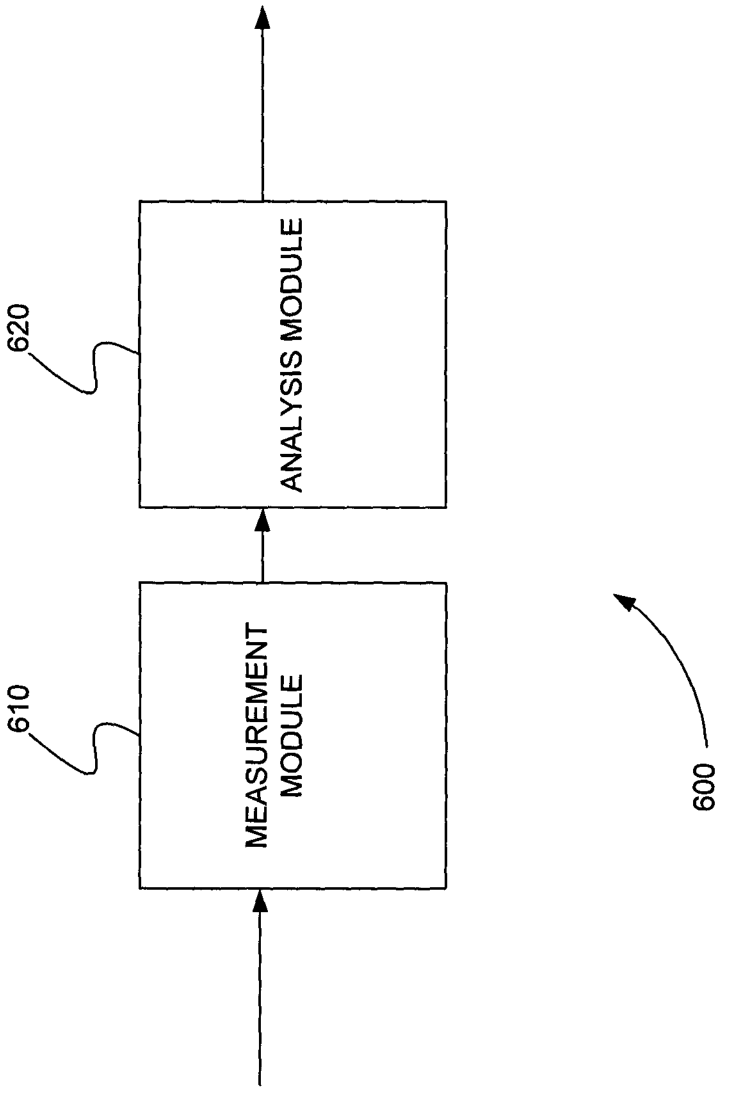
FIG. 6 is a schematic diagram of a system that includes one or more distinct software modules that perform a method for compressing time-of-flight mass spectrometry data, in accordance with various embodiments.

FIG. 6 is a schematic diagram of a system 600 that includes one or more distinct software modules that perform a method for compressing time-of-flight mass spectrometry data, in accordance with various embodiments. System 600 includes measurement module 610 and analysis module 620.

Measurement module 610 obtains a time series of data points representing amounts of detected ions per unit time produced by a time-of-flight mass spectrometer that analyzes a sample.

Analysis module 620 receives the resolution of the time-of-flight mass spectrometer, the digitization time period of the time-of-flight mass spectrometer, and the minimum number points per peak needed to maintain the information content of a peak. Analysis module 620 calculates a peak width value for each point in the time series from the resolution and the time of the each point. Analysis module 620 divides the calculated peak width value for each point in the time series by the minimum number points per peak producing the maximum time difference between points for each point in the time series. Analysis module 620 selects a point of the time series that has a time greater than a time of a point of the time series that has a maximum time difference between points greater than or equal to the digitization time period. Analysis module 620 locates a first point of the time series adjacent to and preceding the selected point and a second point of the time series adjacent to and following the selected point. Finally, if a difference in time between the time of the first point and the time of the second point does not exceed a sum of a maximum time difference of the first point and a maximum time difference of the second point, analysis module 620 deletes the selected point to compress the time series.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for compressing time-of-flight mass spectrometry data, comprising:

a time-of-flight mass spectrometer that analyzes a sample producing a time series of data points representing amounts of detected ions per unit time; and a processor in communication with the time-of-flight mass spectrometer that receives a resolution of the time-of-flight mass spectrometer, a digitization time period of the time-of-flight mass spectrometer, and a minimum number points per peak needed to maintain the information content of a peak, calculates a peak width value for each point in the time series from the resolution and a time of the each point, divides the calculated peak width value for each point in the time series by the minimum number points per peak producing a maximum time difference between points for each point in the time series, selects a point of the time series that has a time greater than a time of a point of the time series that has a maximum time difference between points greater than or equal to the digitization time period, locates a first point of the time series adjacent to and preceding the selected point and a second point of the time series adjacent to and following the selected point, and if a difference in time between a time of the first point and a time of the second point does not exceed a sum of a maximum time difference of the first point and a maximum time difference of the second point, deletes the selected point to compress the time series.

2. The system of claim 1, wherein the processor calculates a peak width value for each point in the time series from the resolution and an arrival time of the each point by dividing the time of the each point by twice the resolution.

3. The system of claim 2, wherein the processor peak width value is a full width half maximum (FWHM) value.

4. The system of claim 1, wherein the processor receives the time series from the time-of-flight mass spectrometer as the time-of-flight mass spectrometer is acquiring the time series.

5. The system of claim 1, wherein the processor receives the time series from the time-of-flight mass spectrometer after the time-of-flight mass spectrometer acquires the time series.

6. A method for compressing time-of-flight mass spectrometry data, comprising:

obtaining a time series of data points representing amounts of detected ions per unit time produced by a time-of-flight mass spectrometer that analyzes a sample;

receiving a resolution of the time-of-flight mass spectrometer, a digitization time period of the time-of-flight mass spectrometer, and a minimum number points per peak needed to maintain the information content of a peak;

calculating a peak width value for each point in the time series from the resolution and a time of the each point;

dividing the calculated peak width value for each point in the time series by the minimum number points per peak producing a maximum time difference between points for each point in the time series;

selecting a point of the time series that has a time greater than a time of a point of the time series that has a maximum time difference between points greater than or equal to the digitization time period;

locating a first point of the time series adjacent to and preceding the selected point and a second point of the time series adjacent to and following the selected point; and if a difference in time between a time of the first point and a time of the second point does not exceed a sum of a maximum time difference of the first point and a maximum time difference of the second point, deleting the selected point to compress the time series.

7. The method of claim 6, wherein calculating a peak width value for each point in the time series from the resolution and a time of the each point comprises dividing the time of the each point by twice the resolution.

8. The method of claim 6, wherein the processor peak width value is a full width half maximum (FWHM) value.

9. The method of claim 6, wherein obtaining a time series of data points representing amounts of detected ions per unit time occurs as the time-of-flight mass spectrometer is acquiring the time series.

10. The method of claim 6, wherein obtaining a time series of data points representing amounts of detected ions per unit time occurs after the time-of-flight mass spectrometer acquires the time series.

11. A computer program product, comprising a non-transitory and tangible computer-readable storage medium whose contents include a program with instructions being executed on a processor so as to perform a method for compressing time-of-flight mass spectrometry data, the method comprising:

providing a system, wherein the system comprises one or more distinct software modules, and wherein the distinct software modules comprise a measurement module and an analysis module;

obtaining a time series of data points representing amounts of detected ions per unit time produced by a time-of-flight mass spectrometer that analyzes a sample using the measurement module;

receiving a resolution of the time-of-flight mass spectrometer, a digitization time period of the time-of-flight mass spectrometer, and a minimum number points per peak needed to maintain the information content of a peak using the analysis module;

calculating a peak width value for each point in the time series from the resolution and a time of the each point using the analysis module;

dividing the calculated peak width value for each point in the time series by the minimum number points per peak producing a maximum time difference between points for each point in the time series using the analysis module;

selecting a point of the time series that has a time greater than a time of a point of the time series that has a maximum time difference between points greater than or equal to the digitization time period using the analysis module;

locating a first point of the time series adjacent to and preceding the selected point and a second point of the time series adjacent to and following the selected point using the analysis module; and if a difference in time between a time of the first point and a time of the second point does not exceed a sum of a maximum time difference of the first point and a maximum time difference of the second point, deleting the selected point to compress the time series using the analysis module.

12. The computer program product of claim 11, wherein calculating a peak width value for each point in the time series from the resolution and a time of the each point comprises dividing the time of the each point by twice the resolution.

13. The computer program product of claim 11, wherein the processor peak width value is a full width half maximum (FWHM) value.

14. The computer program product of claim 11, wherein obtaining a time series of data points representing amounts of detected ions per unit time occurs as the time-of-flight mass spectrometer is acquiring the time series.

15. The computer program product of claim 11, wherein obtaining a time series of data points representing amounts of detected ions per unit time occurs after the time-of-flight mass spectrometer acquires the time series.

* * * * *